June 2, 1931. T. G. SCHMEISER 1,807,757
COMBINED WHEEL FIN AND WEIGHT
Filed Feb. 27, 1929
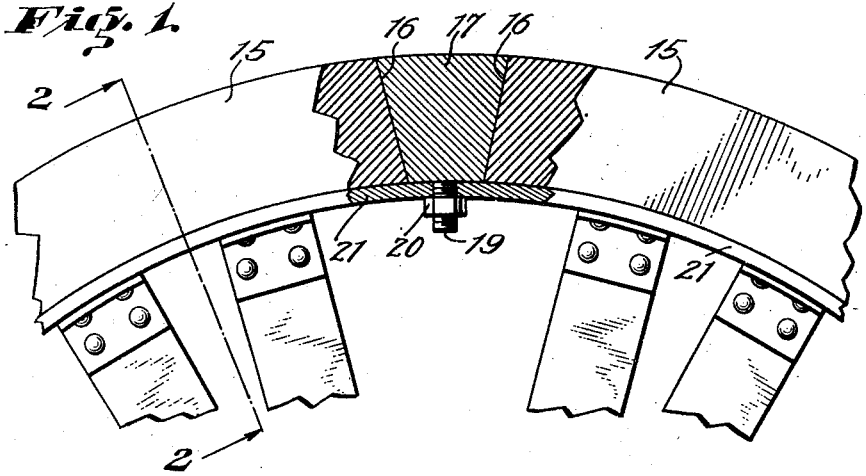
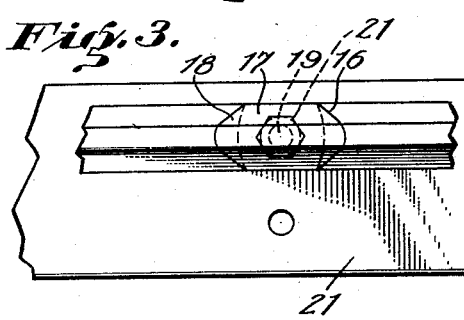
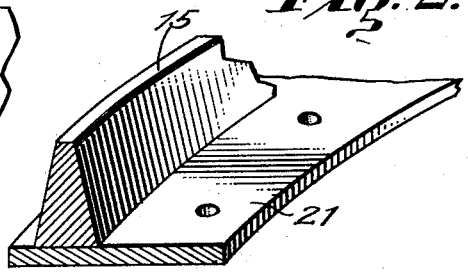
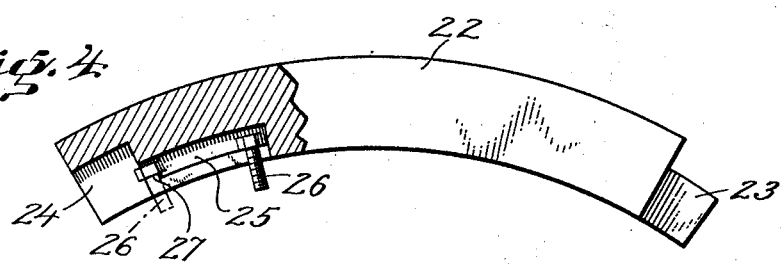
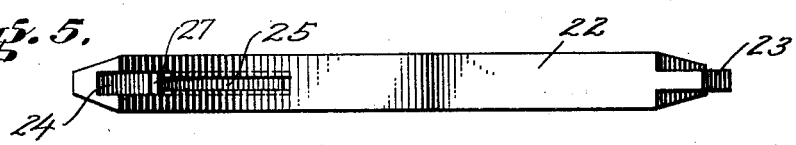
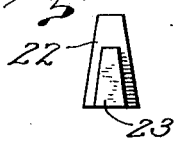
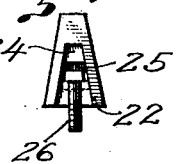
INVENTOR.
Theodore G. Schmeiser
ATTORNEYS.

Patented June 2, 1931

1,807,757

UNITED STATES PATENT OFFICE

THEODORE G. SCHMEISER, OF FRESNO, CALIFORNIA

COMBINED WHEEL FIN AND WEIGHT

Application filed February 27, 1929. Serial No. 343,027.

My invention has reference to tractors which as heretofore constructed have front wheels interiorly weighted to give the additional weight necessary to prevent backward tilting of the tractor, and circular fins on the rims of the front wheels to prevent lateral skidding of the wheels and to otherwise aid in steering the wheels.

It is a purpose of my invention to provide an attachment for the front wheels of tractors and similar vehicles which accomplishes the double result of lending to the wheels the additional weight to prevent backward tilting of the tractor, and the prevention of sidewise skidding of the wheels. It is also a purpose of my invention to provide a wheel fin composed of a plurality of sections with means for removably securing the sections immovably on a wheel without in any way modifying the present construction of tractor wheels.

I will describe only two forms of combined wheel fins and weights each embodying my invention and will then point out the novel features thereof in claims.

In the accompanying drawings:

Fig. 1 is a fragmentary view showing in side elevation a tractor wheel having applied thereto one form of combined wheel fin and weight embodying my invention with portions of the latter in section.

Fig. 2 is a sectional perspective view of one of the sections of the combined wheel fin and weight in applied position to the rim of a tractor wheel.

Fig. 3 is a fragmentary view on a reduced scale showing in top plan a wheel rim with the combined wheel fin and weight in applied position thereon.

Fig. 4 is a view showing in side elevation and partly in section one section of another form of combined wheel fin and weight embodying my invention.

Fig. 5 is a bottom plan view showing the section shown in Fig. 4.

Fig. 6 is a view showing the section of Figs. 4 and 5 in right hand end elevation, and Fig. 7 is a similar view in left hand end elevation.

My invention in either of the two embodiments herein illustrated is characterized by an annular body of a diameter to encircle the rim of a tractor wheel, and of such cross sectional contour and material that when it is in applied position upon a wheel rim it gives the necessary additional weight to oppose any upward tilting movement of the front end of a tractor, and further, the annular body functions as a fin to prevent sidewise skidding of the wheel and to otherwise aid in steering movements thereof. The annular body is formed of a plurality of segmental sections arranged in end to end relation with means associated with the confronting ends of adjacent sections for fixedly securing the sections in end to end relation and against the rim of the wheel all in a manner to maintain the sections against movement with relation to each other and to the wheel so that when once applied the sections will coact to properly perform the functions of a wheel fin. The means employed for securing the sections to the wheel rim are such that the sections may be individually removed from the wheel in order to permit the substitution of new sections when required.

In the form of my invention illustrated in Figs. 1, 2, and 3, the sections of the annular body are indicated at 15, and as illustrated in Fig. 2 each section has the cross-sectional contour of a wedge, the section increasing from its inner periphery to its outer periphery to the extent of providing an outer edge to the annular body that is sufficiently sharp to readily penetrate the earth that the annular body may function to prevent sidewise skidding of the tractor wheel when in applied position thereto. As best illustrated in Figs. 1 and 2, the confronting ends of any two adjacent sections 15 are formed with cupped or concave portions 16 in order to receive therebetween an attaching element 17 having projecting convex portions 18 which are adapted to seat in the concave portions of the sections to the end of securing the sections against relative transverse movement. The attaching element 17 has the same cross-sectional contour as that of the sections in order that the outer edge of the annular body may be made continuous, but those sides of the attaching element confronting the ends of the sections converge from the outer end of the element inwardly thus forming a wedge which is adapted to coact with the converging contour of the confronting ends of the sections to secure the sections against radial displacement from the rim of the wheel when once in applied position thereto. The just described construction of the attaching element and confronting ends of the sections 15 is clearly illustrated in Fig. 1.

The attaching element 17 is provided at its inner end with a stud 19 screw threaded to receive a nut 20 and of such length as to extend through a bolt opening in the rim 21 of the tractor wheel so that when the nut 20 is applied to the stud at the inner side of the rim, the attaching element will be drawn inwardly against the rim and thus held in fixed position thereon. Thus with the several attaching elements applied between the ends of the several sections constituting the annular body, the sections are secured against transverse, longitudinal and radial movements in respect to each other and to the wheel of the rim. The bolt openings of the conventional tractor wheel may be employed to receive the studs 19, and as the conventional tractor wheel is made with two annular series of bolt openings, the segmental sections constituting my wheel fin may be applied to either series of bolt openings, and in either instance the fin is disposed at one side or the other of the rim as illustrated in Figs. 2 and 3. In a fin of my construction, the positioning thereof on the wheel rim provides the advantage of leaving uncovered a major portion of the thread surface of the rim in order that maximum traction may be provided, as will be understood.

In the form of my invention illustrated in Figs. 4 to 7 inclusive, each fin section indicated at 22 is of the same general shape as the sections 15 in the first form of my invention, and they are adapted to be arranged in end to end relation on the rim of a wheel to provide the annular fin body. However, in this embodiment I provide a different means for attaching the fin section to each other and to the wheel rim so as to fixedly secure the fin sections in end to end relation and yet permit their ready removal from the wheel rim when and as required.

As illustrated in Figs. 4 to 7 each fin section is provided at one end with a tongue 23, the inner edge of which is flush with the inner face of the fin section. On the opposite end of the fin section is a groove or pocket 24 shaped to receive the tongue 23 of an adjacent fin section and coacting therewith to lock the confronting ends of the two sections against transverse displacement. Extending inwardly from the groove 24 is a channel 25 having the cross-sectional contour of a T as illustrated in Fig. 7 and adapted to receive the conventional form of bolt 26. The construction of the channel 25 is such that once the bolt is applied as illustrated in Figs. 4 to 7, the bolt head is free to move longitudinally within the channel but it is retained therein against displacement transversely of the channel by the shoulders formed on the side walls of the channel. To prevent accidental displacement of the bolt 26 during the application and removal of the fin section to or from a wheel rim, the entrance end of the channel 25 is restricted by lugs 27 so positioned as to permit passage of the bolt head into the channel when the bolt is applied as illustrated in dashed lines in Fig. 4. Once the bolt head has passed the lugs 27 it gravitates to a position in which the bolt head is below the lugs so that the latter act to preclude movement of the bolt head outwardly of the channel.

With the bolt 26 applied within the channel as illustrated in Fig. 4, the fin section may be secured to the wheel rim by extending the shank of the bolt through one of the bolt openings of the wheel rim and then applying a nut to the inner side of the rim and adjusting the nut on the bolt until the fin section is drawn tightly against the wheel rim. With the fin section secured to the wheel rim in this manner, it will be clear that the other sections of the fin can be successively applied with the tongues 23 seating within the grooves 24, and thus in coaction with the several bolts 26, the fin sections are fixedly secured in annular body formation on the wheel rim.

The channel 25 is of such length as to permit adjustment of the bolt 26 longitudinally of the fin section in order that such bolt may be positioned to be extended through the bolt opening of the wheel rim. Such adjustment compensates for variation in spacing of the bolt openings in the various makes of tractor wheels.

Although I have herein shown and described only two forms of combined wheel fins and weights embodying my invention, it is to be understood that various changes and modifications may be made herein without departing from the spirit of the invention and the spirit and scope of the appended claims.

I claim:

1. A fin for tractor wheels, comprising an annular body formed of segmental sections, tongue and groove connections between the ends of the sections, said sections being formed with channels extending circumferentially thereof and inwardly from the groove ends of the sections so that one end of each channel is in communication with the adjacent groove to permit a bolt to be inserted into the channel through the groove and the closing of said end by the tongue of an adjacent section when inserted into the groove.

2. A fin for tractor wheels as embodied in claim 1 wherein lugs are formed on each fin section at the entrance end of the channel of a size to restrict said end in such manner that a bolt can be inserted into the channel or removed therefrom only when the shank of the bolt is at right angles to the channel.

THEODORE G. SCHMEISER.